US012425764B2

(12) United States Patent
Hyatt

(10) Patent No.: US 12,425,764 B2
(45) Date of Patent: Sep. 23, 2025

(54) TUNABLE RESONANCE GENERATOR

(71) Applicant: Delton Hyatt, Phoenix, AZ (US)

(72) Inventor: Delton Hyatt, Phoenix, AZ (US)

(*) Notice: Subject to any disclaimer, the term of this patent is extended or adjusted under 35 U.S.C. 154(b) by 270 days.

(21) Appl. No.: 18/352,199

(22) Filed: Jul. 13, 2023

(65) Prior Publication Data

US 2025/0024193 A1 Jan. 16, 2025

(51) Int. Cl.
*H04R 1/24* (2006.01)
*H04R 1/28* (2006.01)

(52) U.S. Cl.
CPC ............ *H04R 1/24* (2013.01); *H04R 1/2811* (2013.01); *H04R 2440/05* (2013.01)

(58) Field of Classification Search
CPC ...... G10K 11/172; G10K 13/00; G10K 11/08; G10K 11/04; G10K 11/26; G10K 11/28; G10K 15/04; H04R 1/24; H04R 1/2811
See application file for complete search history.

(56) References Cited

U.S. PATENT DOCUMENTS

| | | | | |
|---|---|---|---|---|
| 4,235,301 | A | 11/1980 | Mitchell | |
| 6,031,920 | A * | 2/2000 | Wiener | H04R 1/345 381/186 |
| 7,912,234 | B1 | 3/2011 | Graber | |
| 8,259,965 | B2 | 9/2012 | Chen | |

* cited by examiner

*Primary Examiner* — Kile O Blair
(74) *Attorney, Agent, or Firm* — Flener IP & Business Law; Zareefa B. Flener

(57) ABSTRACT

A tunable resonance generator includes a sound reflecting body and a speaker fixed on a support member that is disposed through the sound reflecting body. The speaker generates sound in a first direction away from the sound reflecting body and in a second opposite direction toward the sound reflecting body.

20 Claims, 3 Drawing Sheets

TUNABLE RESONANCE GENERATOR

FIELD OF THE INVENTION

The present invention relates generally to a sound generator that produces sound having a tunable resonance at predetermined frequencies. In particular, the present invention relates generally to a sound generator wherein two streams of sound are constructively additive for a predetermined base frequency and harmonics thereof, and wherein that predetermined base frequency is tunable.

BACKGROUND

Resonant sound as the terminology is used herein refers to refers to sound having a frequency spectrum that includes a base frequency and many harmonics of the base frequency. Such sound is typically identifiable as being full and rich because of the effect of the harmonics blending together, and is traditionally produced using a sound source comprising one or more tuning forks, or bowls, or drums, or gongs, where the "resonant" terminology comes from the sound source being struck and vibrating at its own resonant vibrational frequencies.

It has been found that resonant sound at particular base frequencies can produce a variety of effects in a receiver's brain. Some of the observed effects include a measurable reduction in stress, depression, and/or anxiety, or improved sleep quality, mental acuity, and even creativity. It is believed that the effects of resonant sound can be used in therapeutic treatment regimes, for example without limitation, to improve or slow the progression of Parkinson's and other neuro-degenerative diseases, wherein the efficacy of the treatment can depend on the base frequency of the resonant sound.

Existing sources for producing resonant sound are limited to a single base frequency, for example, in the case of a tuning fork, there is a single resonant frequency that may include harmonics thereof. A need therefore exists for a device that can generate resonant sound in a range of base frequencies that could potentially be used for treating a variety of conditions, wherein the base frequency can be selected to be most therapeutic for a given condition. It would be beneficial if the device could generate any sort of sound or music including resonance at particular base frequencies and harmonics thereof. It would be further beneficial if the device could be quickly tuned to change the base frequency as needed.

SUMMARY OF THE INVENTION

In one aspect of the invention, a tunable resonance generator comprises a sound reflecting body and a speaker fixed on a support member that is disposed through the sound reflecting body. The speaker generates sound in a first direction away from the sound reflecting body and in a second opposite direction toward the sound reflecting body.

In another aspect of the invention, a tunable resonance generator comprises a sound reflecting body and a speaker fixed on a support member that is disposed through the sound reflecting body. The speaker generates sound in a first direction away from the sound reflecting body and in a second opposite direction toward the sound reflecting body. The support member is configured to move relative to the sound reflecting body to adjust a distance between the speaker and the sound reflecting body.

In a further aspect of the invention, a tunable resonance generator comprises a sound reflecting body and a speaker fixed on a support member that is disposed through the sound reflecting body. The tunable resonance generator further comprises a geared portion on the support member and a driven gear. The speaker generates sound in a first direction away from the sound reflecting body and in a second opposite direction toward the sound reflecting body. The support member is configured to move relative to the sound reflecting body to adjust a distance between the speaker and the sound reflecting body, and the geared portion is configured to mesh with the driven gear for moving the support member relative to the sound reflecting body.

Additional aspects and advantages of the present disclosure will become readily apparent to those skilled in this art from the following detailed description, wherein only illustrative embodiments of the present disclosure are shown and described.

BRIEF DESCRIPTION OF THE DRAWINGS

Other aspects and advantages of the present invention will become apparent upon consideration of the following detailed description, wherein similar structures have similar reference numerals.

DETAILED DESCRIPTION

Figure 1:
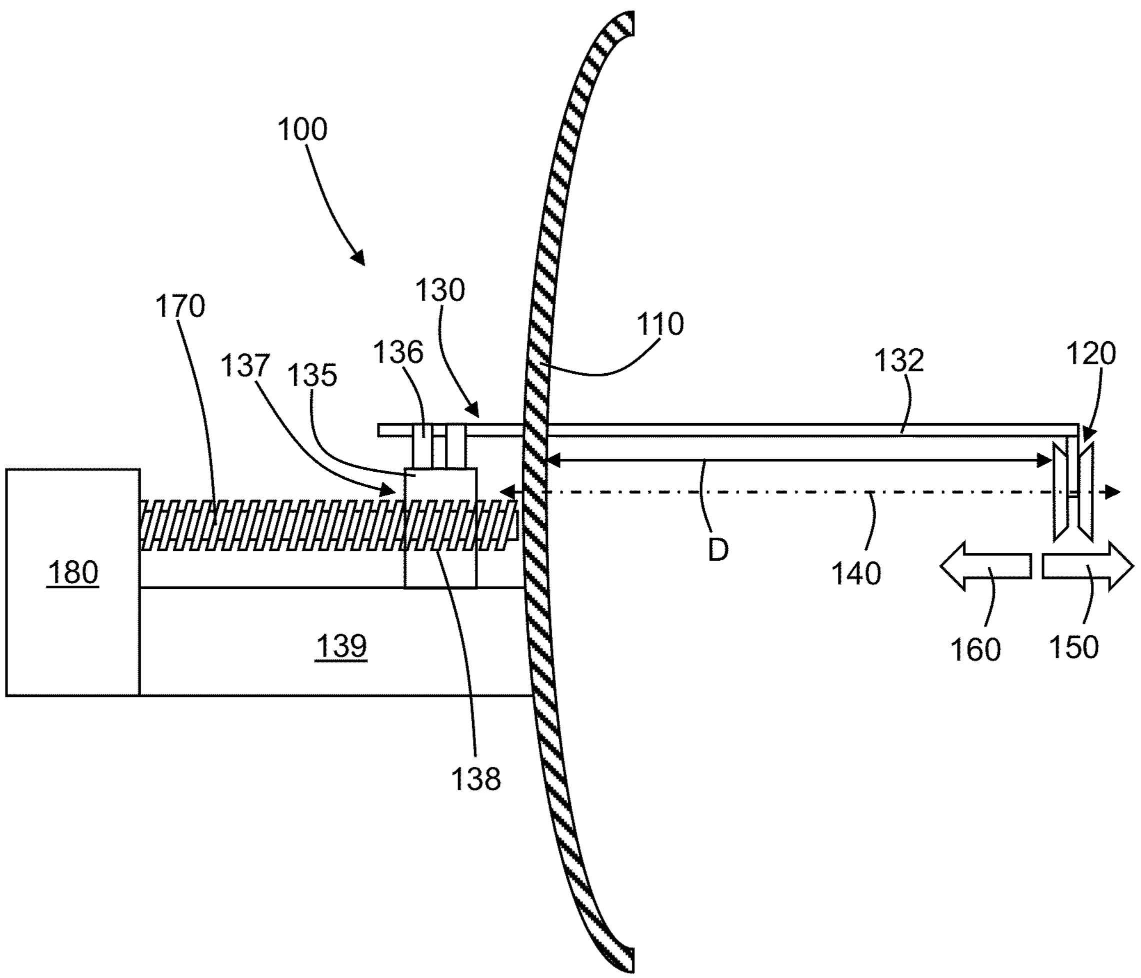
FIG. 1 illustrates a schematic diagram of a tunable resonance generator according to an embodiment.

The following detailed embodiments presented herein are for illustrative purposes. That is, these detailed embodiments are intended to be exemplary of the present invention for the purposes of providing and aiding a person skilled in the pertinent art to readily understand how to make and use of the present invention. In the descriptions that follow identical reference numerals used to describe components of different disclosed embodiments refer to identical components that may be part of the different disclosed embodiments.

Referring to FIG. 1, in an embodiment a tunable resonance generator (TRG) 100 comprises a sound reflecting body 110, which is shown in cross-section for clarity in FIG. 1. In an embodiment a speaker 120 is fixed on a support member 130 that is disposed through or connected with the sound reflecting body 110. In an embodiment the sound reflecting body 110 has a bowl shape as shown. In other embodiments the sound reflecting body 110 is a parabolic bowl, a non-parabolic bowl having a cross-sectional shape other than what is shown, or a flat plate.

In an embodiment the speaker 120 is fixed on the support member 130 so that a center of the speaker 120 is aligned with a center of the sound reflecting body 110 as indicated by a common centerline 140 passing through both the speaker 120 and the sound reflecting body 110. In other embodiments a centerline of the speaker 120 is not aligned with a centerline of the sound reflecting body 110. In an embodiment the speaker 120 is a conventional electrically driven speaker having a magnet and a coil driving vibrating diaphragms, but in other embodiments the speaker 120 can be any sort of speaker as is known in the art. In an embodiment the speaker 120 generates sound in a first direction indicated by arrow 150 away from the sound reflecting body 110 and in a second opposite direction indicated by arrow 160 toward the sound reflecting body 110.

In an embodiment the support member 130 is configured to move relative to the sound reflecting body 110 to adjust a distance D between the speaker 120 and the sound reflecting body 110. In an embodiment the support member 130, for example without limitation, includes a supporting rod 132 extending from a sliding stage 135, which is shown transparently in FIG. 1. In an embodiment the sliding stage 135 includes a passage 137 disposed through it, wherein the passage 137 has an interior gear or threads 138. In an embodiment the supporting rod 132 is attached to the sliding stage 135 by a clamp or fasteners 136 or the like, but in other embodiments the supporting rod 132 is integral with the sliding stage 135.

In an embodiment the TRG 100 further comprises a driven gear or threaded rod 170 wherein the interior gear or threads 138 of the sliding stage 135 is configured to mesh with the driven gear or threaded rod 170. The sliding stage 135 is disposed in contact with a slide base 139 so that when the driven gear or threaded rod 170 is rotated around its longitudinal axis, the interaction between the driven gear or threaded rod 170 and the interior gear or threads 138 forces the sliding stage 135 to move along the driven gear or threaded rod 170. Movement of the sliding stage 135 along the driven gear or threaded rod 170 moves the support member 130 relative to the sound reflecting body 110, thereby moving the speaker 120 toward or away from the sound reflecting body 110. Therefore, by turning the driven gear or threaded rod 170, the distance D can be made larger or smaller. In an embodiment a stepper motor 180, for example, as connected to and controlled by a user interface 240 (see FIG. 3), is provided to precisely drive the driven gear or threaded rod 170, and thereby precisely adjust the distance D. In other embodiments the distance D can be adjusted by manually turning the driven gear or threaded rod 170.

Figure 2:
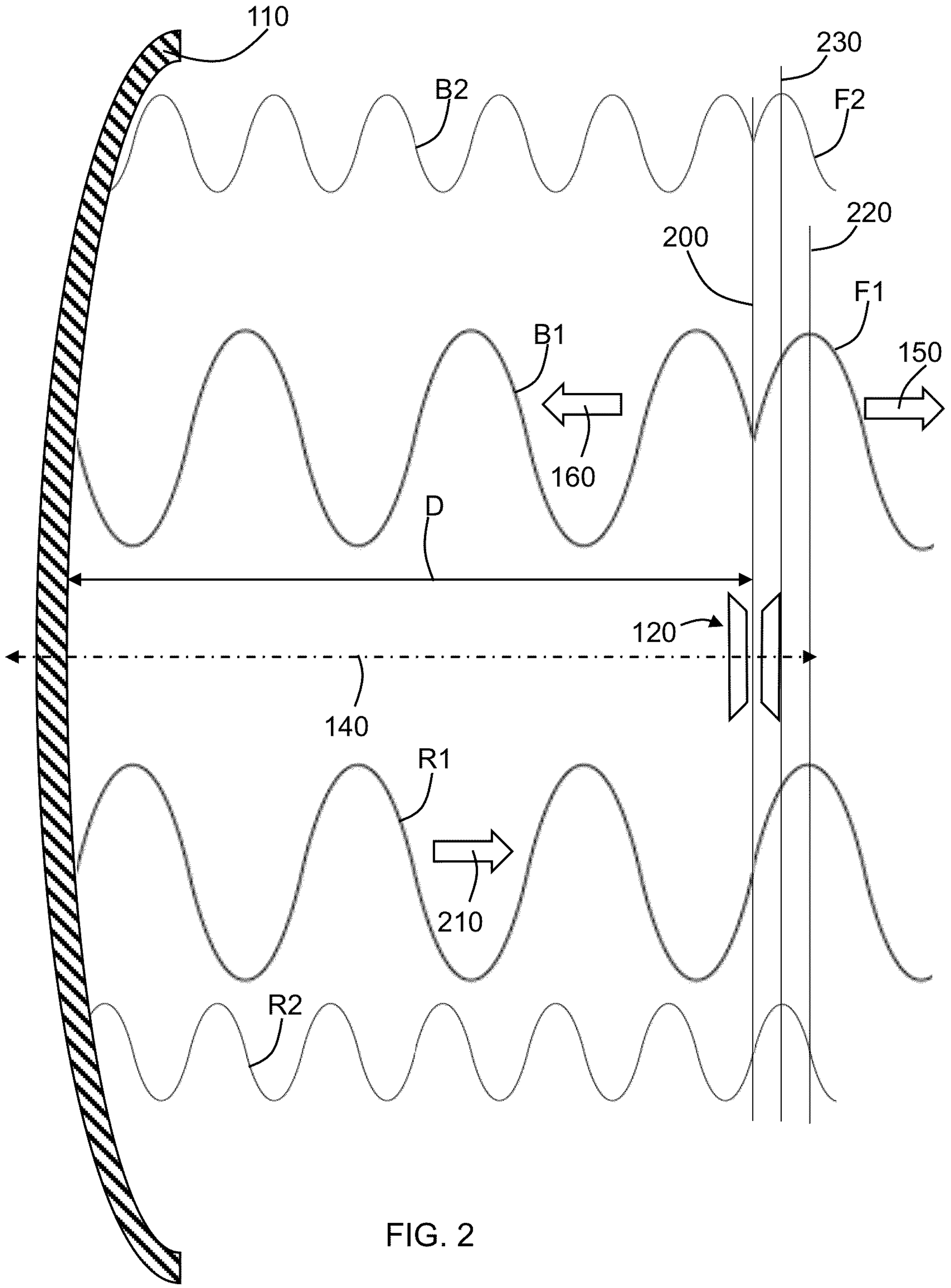
FIG. 2 illustrates the constructive addition of sound waves directed away from and toward a sound reflecting body according to an embodiment.

Referring to FIG. 2, the sound reflecting body 110 and the speaker 120 are shown without the supporting structure illustrated in FIG. 1. Without being held to theory, sound comprises pressure waves that propagate through the air and that can be represented in a sinusoidal representation as pressure waves F1, F2, B1, B2, R1, and R2 in FIG. 2. Assuming for ease of explanation that the speaker 120 has zero effective width along the centerline 140, sound generated by the speaker 120 emanates from the reference line 200. Then for example, the speaker 120 generates sound including a sound wave F1 of a given frequency in a first direction indicated by arrow 150 away from the sound reflecting body 110 and a sound wave B1 of the given frequency in a second opposite direction indicated by arrow 160 toward the sound reflecting body 110. The speaker 120 can generate a single frequency, multiple distinct frequencies, or a continuous spectrum of frequencies that may take the audible form of a single tone, multiple tones, or music of any sort or style in both the first and second directions 150, 160.

Again, without being held to theory, the sound wave B1 will reflect from the sound reflecting body 110 and propagate back toward the speaker 120 as reflected wave R1 traveling in the direction of arrow 210. If the distance D matches the wavelength or a multiple of the wavelength of the sound wave B1, then the amplitudes of the sound waves F1 and R1 will be constructively additive at the given frequency, as can be seen by the peaks of the sound waves F1 and R1 aligning along reference line 220 in FIG. 2.

Similarly, FIG. 2 further illustrates sound waves F2, B2, and R2, traveling in the same directions as F1, B1, and R1, respectively, and having, for example, twice the frequency of F1, B1, and R1. Thus, the sound waves F2, B2, and R2 are the first higher harmonic of the sound waves F1, B1, and R1. Again, if the distance D matches the wavelength or a multiple of the wavelength of the frequency of the sound waves F2, B2, and R2, then the amplitudes of the sound waves F2 and R2 will be constructively additive at the first higher harmonic frequency, as can be seen by the peaks of the sound waves F2 and R2 aligning along reference line 230 in FIG. 2. Without being held to theory or showing additional higher harmonic sound waves on FIG. 2, the other higher harmonics will also add constructively if the distance D matches the wavelength or a multiple of the wavelength of the frequency of the sound waves. Additionally, the lower harmonics of sound waves will also add constructively (for example, B1 is a lower harmonic of B2) so long as the distance D matches the wavelength or a multiple of the wavelength of the lower harmonic sound waves.

Of course, in reality the speaker 120 has a finite width, but any source offset caused by the finite width can accounted for by adjustment of the distance D so that the sound reflected from the sound reflecting body 110 adds constructively with the sound directed away from the sound reflecting body 110 for any desired predetermined frequency, where a change in the distance D between the speaker 120 and the sound reflecting body 110 changes the predetermined frequency.

If each predetermined frequency is considered to be a base frequency, then this constructive addition of the base frequencies and their harmonics boosts the sound levels for the constructively added frequencies in the generated sound, where the affected frequencies are tunable by adjusting the distance D. In fact, without being held to theory, the base frequency and its harmonics can be tuned to any frequency as desired by adjusting the distance D. In an embodiment the predetermined base frequency is in a range of frequencies from about 100 Hz to about 1200 Hz. In an embodiment the predetermined base frequency is about 200 Hz.

Further, without being held to theory, the material properties of the sound reflecting body 110, can have an effect on the efficiency of the reflection of the base frequency and the harmonics thereof. For example, without limitation, the stiffness, thickness, material density, surface hardness, and diameter of the sound reflecting body 110 can be factors in how strong the reflected sound waves are both for the base frequency and the harmonics thereof, which influences the richness and fullness of the overall resonant sound that is produced.

Figure 3:
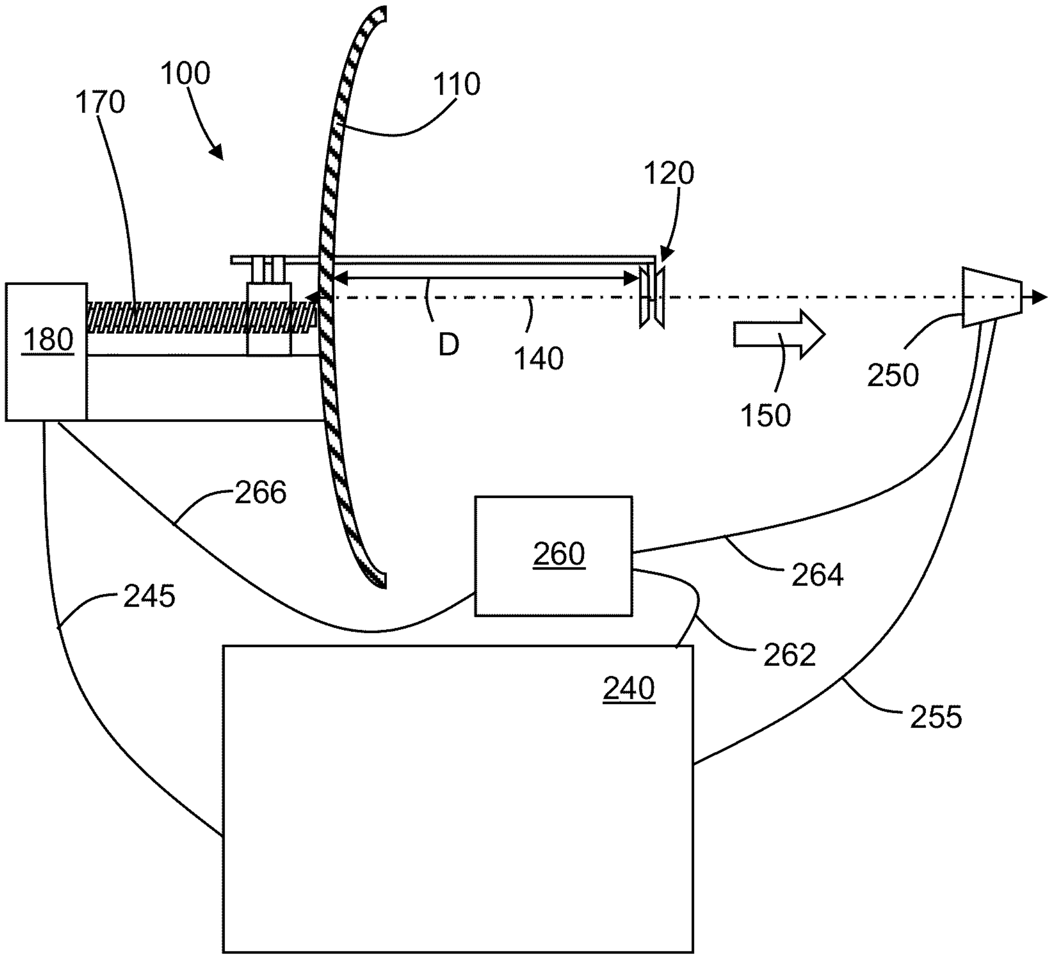
FIG. 3 illustrates a schematic diagram of a tunable resonance generator system further including a feedback control loop for tuning the tunable resonance generator.

Referring to FIG. 3, in an embodiment the stepper motor 180, for example, as connected to and controlled by the user interface 240, is provided to precisely drive the driven gear or threaded rod 170, and thereby precisely adjust the distance D. In an embodiment the user interface is in electrical communication with the stepper motor 180, for example, via a wired connection 245, or via a wireless connection that utilizes any wireless communication protocol as is known in the art.

In an embodiment the stepper motor 180 is controlled by user input via the user interface 240 to drive the driven gear 170. For example, the user interface can include a setting for the distance D allowing the user to increase or decrease the distance D, for example without limitation, by pressing on a displayed arrow, or by turning a knob, or by entering a numerical distance via a touchscreen or keyboard, or the like. In response to the user's manual input into the user interface 240, the stepper motor 180 drives the driven gear 170 in a rotational direction to increase or decrease the distance D, as required.

Still referring to FIG. 3, in an embodiment the TRG 100 further includes a microphone 250 in electrical communication with the user interface 240, for example, via a wired connection 255, or via a wireless connection that utilizes any wireless communication protocol as is known in the art. In an embodiment the microphone 250 is disposed in the first direction 150 from and facing the speaker 120. In an embodiment the TRG 100 further comprises a processor 260 in electrical communication with the user interface 240, the microphone 250, and the stepper motor 180, for example, via respective wired connections 262, 264, and 266, or via wireless connections that utilize any wireless communication protocol as is known in the art.

In an embodiment the user interface 240 is configured to accept user input of a predetermined base frequency, for example without limitation, by pressing on a displayed arrow to increase or decrease a displayed frequency, or by turning a knob, or by entering a numerical frequency via a touchscreen or keyboard, or the like. In an embodiment the processor 260 analyzes sound detected by the microphone 250 and transmitted as an electronic signal from the microphone 250 to the processor 260. Upon analyzing the sound, the processor 260 signals the stepper motor 180 to adjust the distance D between the speaker 120 and the sound reflecting body 110 until the sound detected by the microphone 250 includes the base frequency and harmonics of the base frequency.

In an embodiment the processor 260, microphone 250, and stepper motor 180 act as a feedback control loop utilizing the electrical signal sent from the microphone 250 to the processor 260 as feedback to adjust the distance D until the analyzed sound includes the base frequency as entered into the user interface 240. Without being held to theory, in an embodiment the feedback control loop can adjust the distance D within seconds (or less) to tune the TRG 100 to any desired base frequency.

INDUSTRIAL APPLICABILITY

A tunable resonance generator (TRG) as presented herein generates a resonant sound at a predetermined base frequency and its harmonics. The predetermined base frequency can be tuned to frequencies known to be efficacious for treatment of physical and mental diseases. The TRG can be manufactured in industry for use by individuals, therapists, and other care givers.

Numerous modifications to the present invention will be apparent to those skilled in the art in view of the foregoing description. It is not desired to limit the invention to the exact construction and operation shown and described, and accordingly, all suitable modifications and equivalents may be resorted to, falling within the scope of the invention. Accordingly, this description is to be construed as illustrative only of the principles of the invention and is presented for the purpose of enabling those skilled in the art to make and use the invention and to teach the best mode of carrying out same. The exclusive rights to all modifications which come within the scope of the appended claims are reserved. All patents, patent publications and applications, and other references cited herein are incorporated by reference herein in their entirety.

I claim:

1. A tunable resonance generator, comprising:

a sound reflecting body; and a speaker fixed on a support member that is disposed through the sound reflecting body;

wherein the speaker generates sound in a first direction away from the sound reflecting body and in a second opposite direction toward the sound reflecting body.

2. The tunable resonance generator of claim 1, wherein the support member is configured to move relative to the sound reflecting body to adjust a distance between the speaker and the sound reflecting body.

3. The tunable resonance generator of claim 2, further comprising a driven gear, wherein the support member comprises a geared portion configured to mesh with the driven gear for moving the support member relative to the sound reflecting body.

4. The tunable resonance generator of claim 3, further comprising a stepper motor, wherein the driven gear is driven by the stepper motor.

5. The tunable resonance generator of claim 2, wherein amplitudes are constructively additive for a predetermined frequency of the sound generated by the speaker in the first direction and the sound generated by the speaker in the second direction and reflected from the sound reflecting body.

6. The tunable resonance generator of claim 5, wherein a change in the distance between the speaker and the sound reflecting body changes the predetermined frequency.

7. The tunable resonance generator of claim 5, wherein the predetermined frequency is in a range of frequencies from about 100 Hz to about 1200 Hz.

8. The tunable resonance generator of claim 7, wherein the amplitudes are constructively additive at the predetermined frequency and one or more harmonics thereof.

9. The tunable resonance generator of claim 1, wherein the sound reflecting body is selected from the group consisting of a flat plate, a non-parabolic bowl, a parabolic bowl, and combinations thereof.

10. A tunable resonance generator, comprising:

a sound reflecting body; and a speaker fixed on a support member that is disposed through the sound reflecting body;

wherein the speaker generates sound in a first direction away from the sound reflecting body and in a second opposite direction toward the sound reflecting body; and wherein the support member is configured to move relative to the sound reflecting body to adjust a distance between the speaker and the sound reflecting body.

11. The tunable resonance generator of claim 10, further comprising:

a driven gear; and a geared portion on the support member;

wherein the geared portion is configured to mesh with the driven gear for moving the support member relative to the sound reflecting body.

12. The tunable resonance generator of claim 11, further comprising a stepper motor, wherein the driven gear is driven by the stepper motor.

13. The tunable resonance generator of claim 10, wherein amplitudes are constructively additive for a predetermined frequency of the sound generated by the speaker in the first direction and the sound generated by the speaker in the second direction and reflected from the sound reflecting body.

14. The tunable resonance generator of claim 13, wherein a change in the distance between the speaker and the sound reflecting body changes the predetermined frequency.

15. The tunable resonance generator of claim 13, wherein the predetermined frequency is in a range of frequencies from about 100 Hz to about 1200 Hz.

16. The tunable resonance generator of claim 15, wherein the amplitudes are constructively additive at the predetermined frequency and one or more harmonics thereof.

17. A tunable resonance generator, comprising:

a sound reflecting body;

a speaker fixed on a support member that is disposed through the sound reflecting body;

a geared portion on the support member; and a driven gear;

wherein the speaker generates sound in a first direction away from the sound reflecting body and in a second opposite direction toward the sound reflecting body;

wherein the support member is configured to move relative to the sound reflecting body to adjust a distance between the speaker and the sound reflecting body; and wherein the geared portion is configured to mesh with the driven gear for moving the support member relative to the sound reflecting body.

18. The tunable resonance generator of claim 17, further comprising:

a stepper motor, wherein the driven gear is driven by the stepper motor; and a user interface in electrical communication with the stepper motor;

wherein the stepper motor is controlled by user input via the user interface to drive the driven gear.

19. The tunable resonance generator of claim 18, further comprising:

a microphone in electrical communication with the user interface, the microphone disposed in the first direction from and facing the speaker; and a processor in electrical communication with the user interface, the microphone, and the stepper motor;

wherein the user interface is configured to accept user input of a predetermined base frequency; and the processor analyzes sound detected by the microphone, and signals the stepper motor to adjust the distance between the speaker and the sound reflecting body until the sound detected by the microphone includes the base frequency and harmonics of the base frequency.

20. The tunable resonance generator of claim 17, wherein amplitudes are constructively additive for a predetermined frequency of the sound generated by the speaker in the first direction and the sound generated by the speaker in the second direction and reflected from the sound reflecting body, wherein the predetermined frequency is in a range of frequencies from about 100 Hz to about 1200 Hz.

* * * * *